United States Patent
Song et al.

(10) Patent No.: US 10,264,462 B2
(45) Date of Patent: Apr. 16, 2019

(54) METHOD AND APPARATUS FOR MITIGATING THE EFFECT OF CERTAIN TYPES OF INTERFERENCE ON A SIGNAL RECEIVED IN A WIRELESS NETWORK

(71) Applicant: Marvell World Trade Ltd., St. Michael (BB)

(72) Inventors: Leilei Song, Sunnyvale, CA (US);
Yi-Ling Chao, Sunnyvale, CA (US);
Hui-Ling Lou, Sunnyvale, CA (US);
Vladan Petrovic, San Jose, CA (US);
Yakun Sun, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 531 days.

(21) Appl. No.: 14/305,495

(22) Filed: Jun. 16, 2014

(65) Prior Publication Data

US 2014/0369278 A1    Dec. 18, 2014

Related U.S. Application Data

(60) Provisional application No. 61/836,073, filed on Jun. 17, 2013, provisional application No. 61/931,432, filed on Jan. 24, 2014.

(51) Int. Cl.
*H04W 16/14*    (2009.01)
*H04L 1/18*    (2006.01)
(Continued)

(52) U.S. Cl.
CPC .......... *H04W 16/14* (2013.01); *H04L 1/1867* (2013.01); *H04L 1/20* (2013.01); *H04W 88/06* (2013.01)

(58) Field of Classification Search
CPC .... H04W 16/14; H04W 88/06; H04L 1/1867; H04L 1/20
See application file for complete search history.

(56) References Cited

U.S. PATENT DOCUMENTS 6,782,044 B1 *  8/2004  Wright ...................... H04L 1/20
                                                                375/224
8,325,621 B2 * 12/2012  Simonsson ........... H04W 52/40
                                                                370/252
(Continued)

FOREIGN PATENT DOCUMENTS

CN        1310525 A      8/2001
CN      102450050 A      5/2012

OTHER PUBLICATIONS

U.S. Appl. No. 14/319,552, filed Jun. 30, 2014, Yakun Sun et al.
(Continued)

*Primary Examiner* — Chirag G Shah
*Assistant Examiner* — Joshua Smith

(57) ABSTRACT

A system including an interference module. The interference module is configured to determine, based on first data to be transmitted from a wireless communication device, information about interference predicted to be caused by the first data being transmitted, and provide, to a receiver of the wireless communication device, the information about the predicted interference. A component of the receiver of the wireless communication device is configured to receive, from the interference module, the information about the predicted interference, and adjust, for a duration of the predicted interference, a function performed by the component of the receiver. The function performed by the component of the receiver is related to processing a signal received by the receiver of the wireless communication device.

14 Claims, 5 Drawing Sheets

(51) Int. Cl.
*H04L 1/20* (2006.01)
*H04W 88/06* (2009.01)

(56) References Cited

U.S. PATENT DOCUMENTS

| | | | | |
|---|---|---|---|---|
| 8,340,580 | B1* | 12/2012 | Epstein | H04W 52/243 455/114.2 |
| 8,417,252 | B2 | 4/2013 | Palanki et al. | |
| 2002/0196845 | A1* | 12/2002 | Richards | H04B 1/719 375/239 |
| 2004/0203987 | A1* | 10/2004 | Butala | H04W 52/367 455/522 |
| 2004/0242157 | A1* | 12/2004 | Klinke | H04B 1/1036 455/63.1 |
| 2004/0247058 | A1* | 12/2004 | Abraham | H04B 1/3805 375/346 |
| 2005/0078616 | A1* | 4/2005 | Nevo | H04W 28/24 370/278 |
| 2005/0099973 | A1* | 5/2005 | Qiu | H04W 52/146 370/328 |
| 2005/0221782 | A1* | 10/2005 | Yao | H04B 1/123 455/296 |
| 2008/0292032 | A1* | 11/2008 | Belogolovy | H04L 27/2614 375/346 |
| 2009/0304121 | A1* | 12/2009 | Pedersen | H04L 25/0212 375/341 |
| 2009/0304122 | A1* | 12/2009 | Fatemi-Ghomi | H04L 25/0212 455/296 |
| 2010/0128618 | A1 | 5/2010 | Simonsson et al. | |
| 2011/0211523 | A1* | 9/2011 | Seo | H04L 1/1854 370/315 |
| 2011/0312288 | A1 | 12/2011 | Fu et al. | |
| 2012/0069766 | A1* | 3/2012 | Fu | H04W 72/1215 370/252 |
| 2012/0207040 | A1* | 8/2012 | Comsa | H04W 72/1215 370/252 |
| 2012/0224610 | A1* | 9/2012 | Baldemair | H04L 25/03159 375/211 |
| 2014/0141825 | A1* | 5/2014 | Koo | H04W 72/082 455/501 |

OTHER PUBLICATIONS

IEEE Std 802.16-2009 (Revision of IEEE Std 802.16-2009), IEEE Standard for Local and metropolitan area networks Part 16: Air Interface for Broadband Wireless Access Systems, LAN/MAN Standards Committee, IEEE Computer Society, IEEE Microwave Theory and Techniques Society (May 29, 2009) IEEE-SA Standards Board, 2082 pages.
IEEE Std 802.11-2012 (Revision of IEEE Std 802.11-2007), IEEE Standard for Information technology—Telecommunications and information exchange between systems Local and metropolitan area networks, Part 11: Wireless LAN Medium Access Control (MAC) and Physical Layer (PHY) Specifications, LAN/MAN Standards Committee of the IEEE Computer Society (Mar. 29, 2012), IEEE-SA Standards Board, 2793 pages.
IEEE Std. 802.11a-1999; Supplement to IEEE Standard for Information Technology—Telecommunications and information exchange between systems—Local and metropolitan area networks—Specific requirements; Part: 11 Wireless LAN Medium Access Control (MAC) and Physical Layer (PHY) specifications; High-speed Physical Layer in the 5 GHz Band; pp. 1-91.
IEEE P802.11g/D8.2 Draft Supplement to Standard [for] Information Technology—Telecommunications and information exchange between systems—Local and metropolitan area network—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; Apr. 2003; 69 pages.
IEEE P802.11n: TGn Sync Proposal Technical Specifications; Syed Aon Mujtaba; IEEE 802.11-04/0889r6; May 2005; 131 pages.
IEEE P802.11ac$^{TM}$/D5.0; Draft Standard for Information Technology—Telecommunications and information exchange between systems—Local and metropolitan area networks—Specific requirements: Part 11: Wireless LAN Medium Access Control (MAC) and Physcial Layer (PHY) specifications: Amendment 4: Enhancements for Very High Throughput for Operation in Bands below 6 GHz; Jan. 2013; 440 Pages.
IEEE Std. 802.11b; Supplement to IEEE Standard for Information technolgy—Telecommunications and information exchange between systems—Local and metropolitan area networks—Specific Requirements—Part 11: Wireless LAN Medium Access Control (MAC) and Physical Layer (PHY) specifications: Higher-Speed Physical Layer Extension in the 2.4 GHz Band; Sep. 16, 1999; 96 Pages.
IEEE Std 802.20-2008; IEEE Standard for Local and metropolitan area networks; Part 20: Air Interface for Mobile Broadband Wireless Access Systems Supporting Vehicular Mobility—Physical and Media Access Control Layer Specification; IEEE Computer Society; Sponsored by the LAN/MAN Standards Committee; Aug. 29, 2008; 1032 pages.
IEEE Std. P802.11ad/D5.0; Draft Standard for information technology—Telecommunications and information exchange between systems Local and metropolitan area networks—Specific requirements; Part 11: Wireless LAN Medium Access Control (MAC) and Physical Layer (PHY) Specifications; Amendment 3: Enhancements for Very High Throughput in the 60 GHz Band; Sep. 2011; 601 Pages.
IEEE P802.11ah/D1.0 Draft Standard for Information Technology—Telecommunications and Information Exchange Between Systems Local and Metropolitan Area Networks—Specific Requirements; Part 11: Wireless LAN Medium Access Control (MAC) and Physical Layer (PHY) Specifications; Amendment 6: Sub 1 GHz License Exempt Operation; Oct. 2013; 394 Pages.
Requirements; Part 11: Wireless LAN Medium Access Control (MAC) and Physical Layer (PHY) Specifications; Amendment 6: Sub 1 GHz License Exempt Operation; Oct. 2013; 394 Pages.
Notification of the First Office Action dated Oct. 23, 2017 corresponding to Chinese Application No. 2014102730051, 17 pages.
Notification of the Second Office Action dated Jun. 11, 2018 corresponding to Chinese Application No. 2014102730051, 9 pages.

* cited by examiner

METHOD AND APPARATUS FOR MITIGATING THE EFFECT OF CERTAIN TYPES OF INTERFERENCE ON A SIGNAL RECEIVED IN A WIRELESS NETWORK

CROSS-REFERENCE TO RELATED APPLICATIONS

This application claims the benefit of U.S. Provisional Application No. 61/836,073, filed on Jun. 17, 2013 and U.S. Provisional Application No. 61/931,432, filed on Jan. 24, 2014. The entire disclosures of the applications referenced above are incorporated herein by reference.

FIELD

The present disclosure relates to communication in a wireless network, and more particularly to mitigating the effects of certain types of interference on a signal received in a wireless network.

BACKGROUND

A wireless communication device such as a long-term evolution (LTE) user equipment (UE) device receives signals from an LTE base station (BS). For example, the UE device may be a 3G and/or 4G wireless (e.g., cellular) communication device. Accordingly, the UE device may include an LTE transceiver. The UE device may also include one or more other types of transceivers (that coexist with the LTE transceiver within the UE device) configured to communicate according to non-LTE protocols. For example, the UE device may include a WiFi transceiver and/or a Bluetooth transceiver. Signals received by one of the transceivers (e.g., signals received by the LTE transceiver from the LTE BS) may experience interference from signals transmitted and/or received by one of the other transceivers (e.g., signals transmitted from the UE device by the WiFi transceiver), or transmitted between other devices in the vicinity of the UE device.

SUMMARY

A system including an interference module. The interference module is configured to determine, based on first data to be transmitted from a wireless communication device, information about interference predicted to be caused by the first data being transmitted, and provide, to a receiver of the wireless communication device, the information about the predicted interference. A component of the receiver of the wireless communication device is configured to receive, from the interference module, the information about the predicted interference, and adjust, for a duration of the predicted interference, a function performed by the component of the receiver. The function performed by the component of the receiver is related to processing a signal received by the receiver of the wireless communication device.

A method includes determining, based on first data to be transmitted from a wireless communication device, information about interference predicted to be caused by the first data being transmitted, and providing, to a receiver of the wireless communication device, the information about the predicted interference. The method further includes, using a component of the receiver of the wireless communication device, receiving the information about the predicted interference, and adjusting, for a duration of the predicted interference, a function performed by the component of the receiver. The function performed by the component of the receiver is related to processing a signal received by the receiver of the wireless communication device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 4:
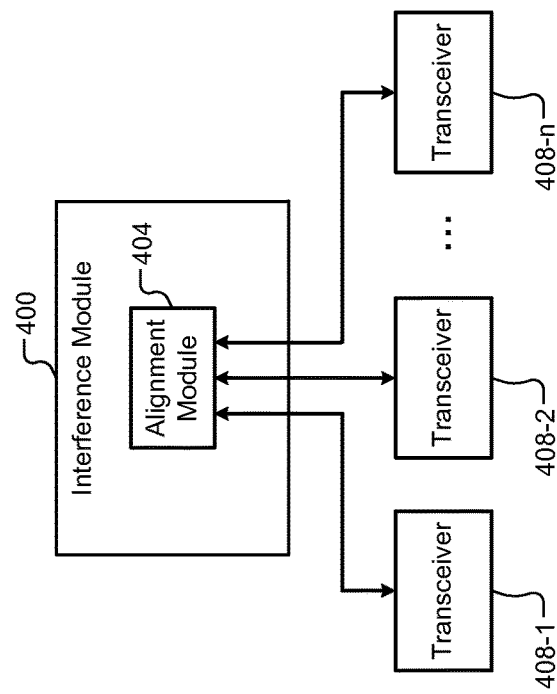
FIG. 4 is an example interference module according to an embodiment of the present disclosure.

A wireless communication device (e.g., a cellular device such as a mobile phone, tablet computer, laptop computer, or other device configured to communicate over a cellular network) may receive cellular signals from (and transmit cellular signals to) a base station (e.g., a serving base station). For example, the wireless communication device may correspond to a 3G, 4G, or other long-term evolution (LTE) user equipment (UE) device.

The wireless communication device may receive interfering signals from radio sources other than the serving base station. For example, nearby devices such as WiFi and Bluetooth devices may communicate in a frequency band overlapping and/or adjacent to a frequency band used for communication between the serving base station and the wireless communication device. In some implementations, the wireless communication device may include other types of transceivers (referred to herein as "coexisting transceivers") that coexist with the LTE transceiver within the wireless communication device—e.g., a WiFi transceiver, and/or a Bluetooth transceiver. Accordingly, WiFi signals and/or Bluetooth signals (transmitted from other devices and/or from the wireless communication device) may interfere with cellular signals received from (and transmitted to) the serving base station. Conversely, the cellular signals may interfere with the WiFi signals and/or Bluetooth signals.

Some systems implement interference estimation and cancellation schemes to mitigate any interference from other devices. Similarly, devices with coexisting transceivers may implement radio frequency (RF) filtering, media access control (MAC) layer arbitration, and other schemes to mitigate interference between the coexisting transceivers. However, interference estimation and cancellation, RF filtering and arbitration may not adequately mitigate the interference. For example, strong interference may subsist after filtering. Further, interference may still corrupt baseband receiver signal processing functions such as automatic gain control (AGC), synchronization, and channel estimation. Even interference of a short duration may corrupt multiple frames of data due to transient effects of receiver signal processing such as filtering.

A wireless communication device according to one embodiment of the present disclosure includes a receiver that implements an interference module. The interference module is configured to identify predicted interference (e.g., known upcoming interference). The interference module provides information about the predicted interference to various components of the receiver (e.g., including, but not limited to, an AGC module, a synchronization module, a channel estimation module, measurement components, data processing components, etc.) The components are configured to adjust processing parameters during a period corresponding to the predicted interference provided by the interference module. In this manner, the components of the receiver constrain and localize any transient effects caused by the interference.

For example, a Wifi transceiver typically transmits an acknowledgment (ACK) packet in response to receiving a data packet. Typically, to eliminate any interference from the transmission of the ACK packet, the wireless communication device may simply be prevented from transmitting the ACK packet. Accordingly, the device that transmitted the data packet to the wireless communication device does not receive the ACK packet and assumes the data packet was lost.

In contrast, the wireless communication device of the present disclosure may selectively permit the WiFi transceiver to transmit the ACK packet. For example, a transmission time for the ACK packet is relatively short. The interference module is configured to provide a notification to the components of the receiver that the ACK packet will be transmitted. The components therefore receive an indication of predicted interference caused by the transmission of the ACK packet and may adjust their own operation accordingly. In this manner, the received data packet is not lost, and other coexisting transceivers (e.g., the cellular transceiver) may continue to receive signals during transmission of the ACK packet. In some implementations, the wireless communication device may align transmission of the signal causing the predicted interference to correspond to selected portions of a concurrently received or transmitted signal.

Although transmitting the ACK packet from the wireless communication device is provided as an example interfering signal, the principles of the present disclosure are applicable to any predicted interference. For example, the predicted interference may include an anticipated ACK packet received by the wireless communication device in response to a data packet transmitted by the wireless communication device. Other types of predicted interference may include, but are not limited to, signals expected to be transmitted or received by a cellular transceiver in the wireless communication device or another device, signals expected to be transmitted or received by a WiFi transceiver in the wireless communication device or another device, and/or signals expected to be transmitted or received by a Bluetooth transceiver in the wireless communication device or another device.

The principles of the present disclosure may be implemented in a wireless communication device configured to operate according to communication protocols including, but not limited to, orthogonal frequency division multiplexing (OFDM) protocols such as IEEE 802.11a, 802.11g, 802.11n, 802.11ac, 3G LTE, WiMax, etc., non-OFDM communication protocols such as IEEE 802.11b, Bluetooth, universal mobile telecommunications system (UMTS), evolved high speed packet access (HSPA+), enhanced voice-data optimized (EVDO), etc., and various coexistence systems including communication according to LTE, WiFi, Bluetooth, etc.

Figure 1:
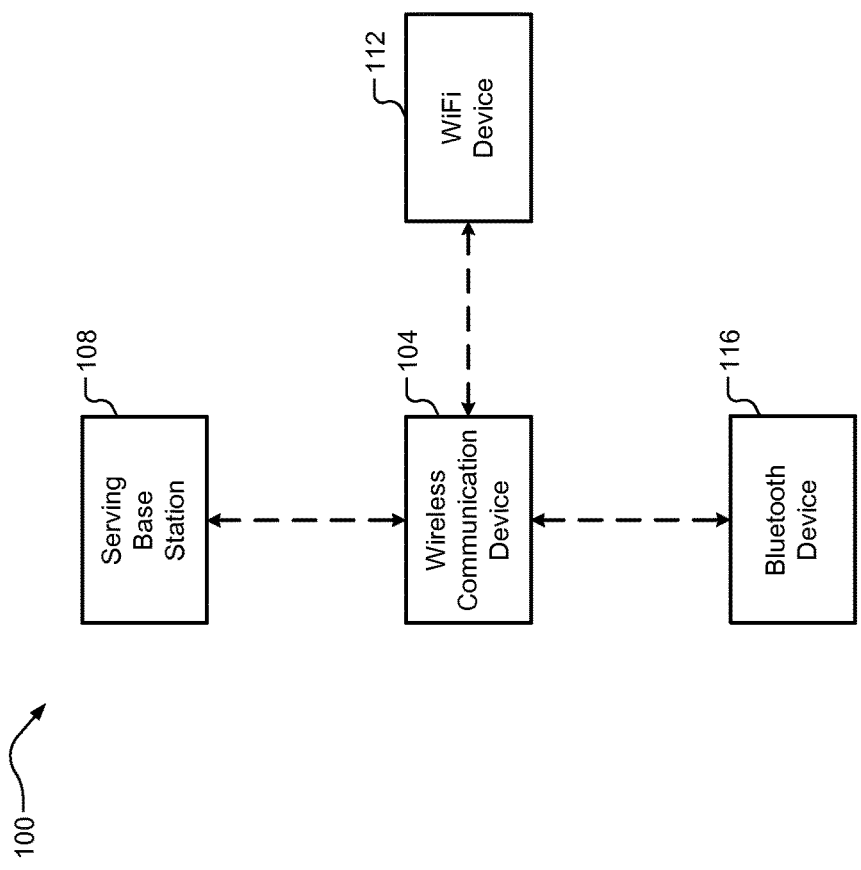
FIG. 1 is an example system including a wireless communication device configured according to an embodiment of the present disclosure.

FIG. 1 shows an example system 100 including a wireless communication device 104 configured according to an embodiment of the present disclosure. The wireless communication device 104 communicates with a serving base station 108. For example only, the wireless communication device may correspond to a smartphone or other device configured to communicate via an LTE cellular communication protocol with the base station 108.

The wireless communication device 104 may receive interfering signals from other devices, such as a WiFi device 112 and/or a Bluetooth device 116. For example, the wireless communication device 104 may include coexisting cellular, WiFi, and Bluetooth transceivers, and/or the interfering signals may correspond to communication between the WiFi device 112 and the Bluetooth device 116 and other devices (not shown).

Figure 2:
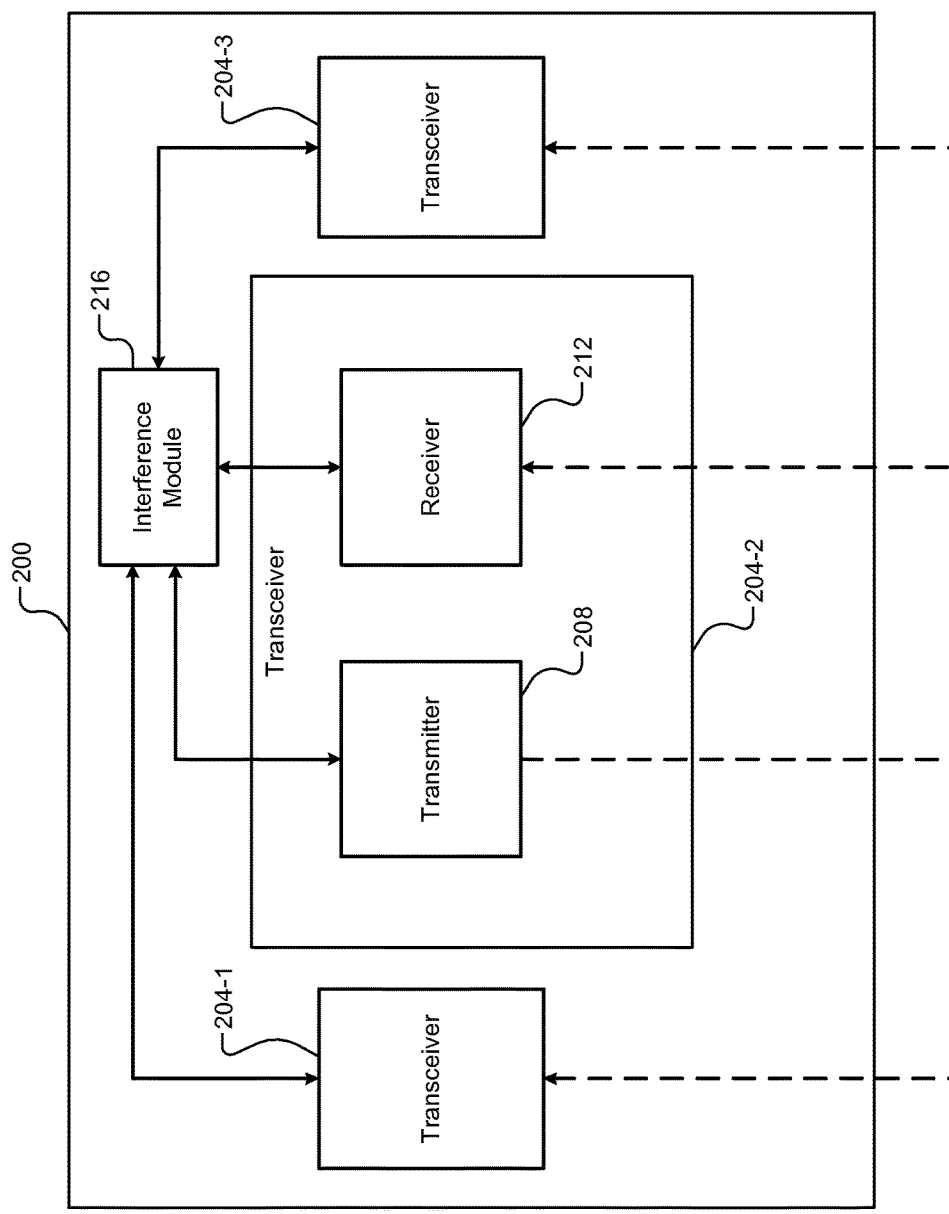
FIG. 2 is an example wireless communication device including an interference module according to an embodiment of the present disclosure.

FIG. 2 shows an example wireless communication device 200 according to an embodiment of the present disclosure. The wireless communication device 200 includes one or more transceivers 204-1, 204-2, and 204-3, referred to collectively as transceivers 204. Each of the transceivers 204 may correspond to a different communication protocol. For example, the transceiver 204-1 may correspond to a WiFi transceiver, the transceiver 204-2 may correspond to a LTE cellular transceiver, and the transceiver 204-3 may correspond to a Bluetooth transceiver. Accordingly, the transceivers 204 may operate in a coexistence configuration within the wireless communication device 200. Although the predicted interference operation will be described with respect to multiple transceivers in the same device, the principles of the present disclosure may also be implemented with respect to communication with one or more transceivers external to the wireless communication device 200.

The transceiver 204-2 includes a transmitter 208 and a receiver 212. An interference module 216 communicates with the transmitter 208 and the receiver 212 of the transceiver 204-2, as well as with respective transmitters and receivers (not shown) of the transceivers 204-1 and 204-3. Specifically, the interference module 216 communicates with each of the transceivers 204 to identify predicted interference (e.g., from data packets expected to be received by or transmitted from one of the transceivers 204), and to provide information about the predicted interference to the transceivers 204.

For example, the interference module 216 may receive information about data packets expected to be received by or transmitted from the transceivers 204-1 and 204-2 and provide information about corresponding predicted interference to the receiver 212. The receiver 212 is configured to adjust operation of one or more receiver components (as described in more detail below in FIG. 3) based on the information about the predicted interference. Conversely, the interference module 216 may receive information about data packets expected to be transmitted from the transmitter 208 or received by the receiver 212, and provide information about the corresponding predicted interference to the transceivers 204-1 and 204-3.

Figure 3:
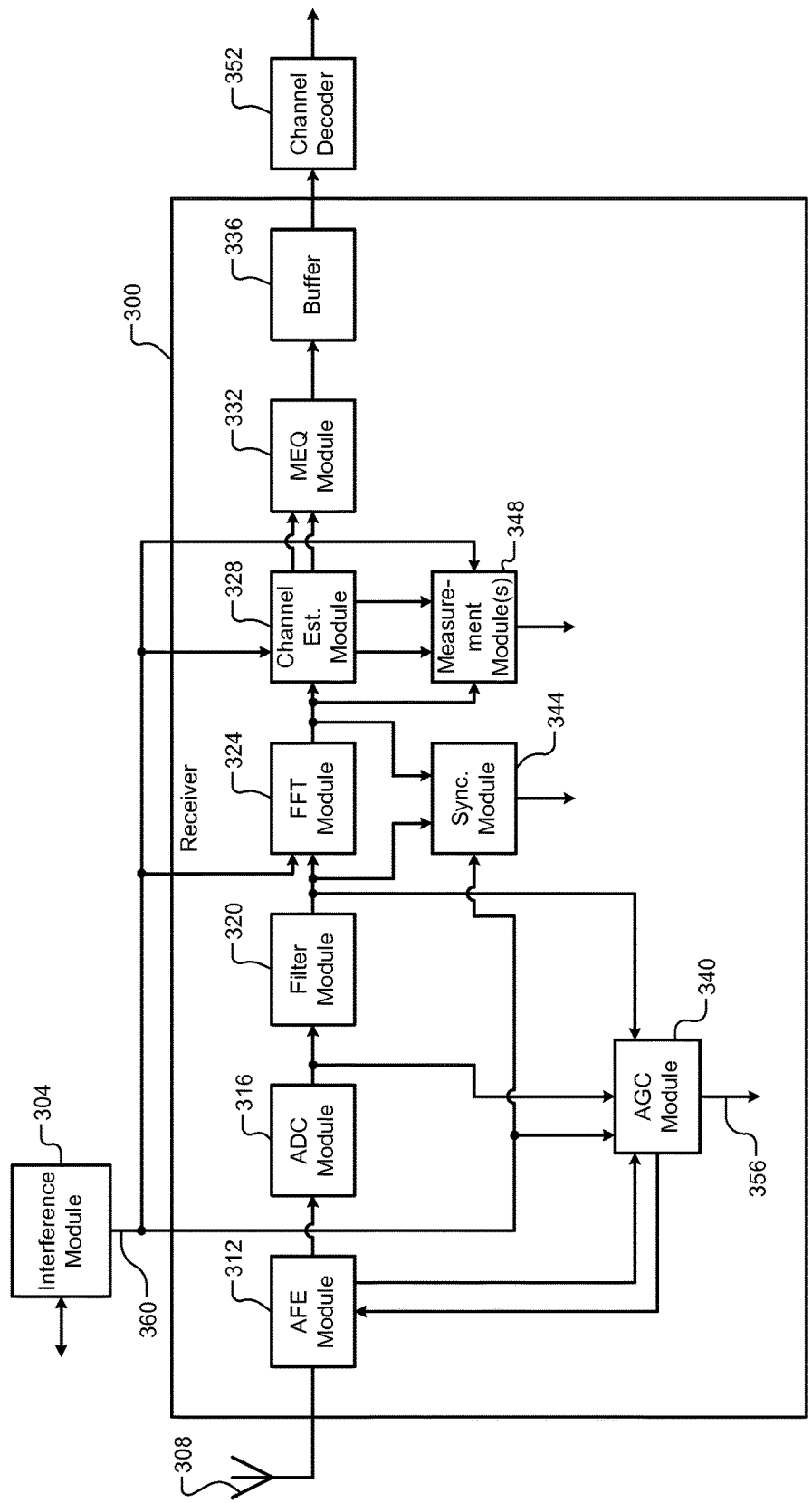
FIG. 3 is an example receiver according to an embodiment of the present disclosure.

FIG. 3 shows an example receiver 300 of a wireless communication device. For example only, the receiver 300 corresponds to a receiver configured to operate according to OFDM protocol, and therefore includes one or more components related to OFDM communication. However, it should be understood that the principles of the present disclosure are also applicable to non-OFDM receivers. The receiver 300 is configured to communicate with an interference module 304 according to an embodiment of the present disclosure. The receiver 300 receives wireless signals via an antenna 308. Although one antenna is shown, the receiver 300 may include a plurality of antennas. For example, the plurality of antennas may be arranged in a multiple-input multiple-output (MIMO) configuration.

The receiver 300 includes, for example only, various receiver components including, but not limited to, an analog front-end (AFE) module 312 (e.g., a radio frequency and analog front-end), an analog-to-digital converter (ADC) module 316, a filter module 320, a fast Fourier transform (FFT) module 324, a channel estimation module 328, a MIMO equalizer (MEQ) module 332, a buffer 336, an automatic gain control (AGC) module 340, a synchronization module 344, and one or more measurement modules 348.

The AFE module 312 processes the wireless signals received via the antenna 308. For example, the AFE module 312 may down-convert the RF signals received via the antenna 308. The ADC module 316 converts an output of the AFE module 312 from an analog format to a digital format. The filter module 320 filters an output of the ADC module 316. For example, the filter module 320 may include a low-pass filter module. The FFT module 324 converts an output of the filter module 320 from the time domain to the frequency domain. An output of the FFT module 324 is further processed by the channel estimation module 328. For example, the channel estimation module 328 generates a channel estimate based on the output of the FFT module 324.

The channel estimation module 328 provides the channel estimate and the received signal (e.g., corresponding to the output of the FFT module 324) to the MEQ module 332. The MEQ module 332 applies MIMO equalization to the received signal based on the channel estimate. The equalized received signal passes through the buffer 336 prior to being received by a channel decoder 352, which decodes the received signal.

The AGC module 340 controls respective gains of the receiver components according to, for example, a signal power measured in the time domain (i.e., a signal power of the received signal prior to being processed by the FFT module 324) and a signal power measured in the frequency domain (i.e., a signal power of the received signal subsequent to being processed by the FFT module 324). The AGC module 340 may filter the measured signal power over time to generate a robust gain update. For example, the AGC module 340 controls the gain of the AFE module 312, and may generate a baseband gain update signal 356. The AGC module 340 may filter the gain update over time to track fluctuations in the measured signal power.

The AGC module 340 further controls the respective gains of the receiver components (such as the gain of the AFE module 312) according to predicted interference information 360 received from the interference module 304. For example, strong interference may degrade performance of the receiver 300 beyond duration of the interference due to transient behavior of filtering and subsequent receiver processing. Accordingly, the AGC module 340 is configured to adjust one or more functions of the AGC module 340 and/or other receiver components in response to the interference information 360. For example, the interference information 360 may include an indication of the duration of the interference. The AGC module 340 may suspend selected functions for at least the duration of the interference to prevent updates to other receiver components that would be affected by the interference.

For example, the AGC module 340 may suspend measurement functions of the AGC module 340 (e.g., signal power measurements) for at least the duration of the predicted interference, and discard any measurements taken during the interference. Similarly, the AGC module 340 may suspend filtering functions and discard any filtering results during the interference. The AGC module 340 may also suspend generation of the gain update signal 356 for at least the duration of the interference. The AGC module 340 resumes any suspended functions when the duration of the interference is complete.

The synchronization module 344 generates synchronization measurements, for example, by measuring incoming baseband samples (e.g., in the time domain or the frequency domain) and generates timing and frequency offset estimates. The synchronization module 344 may average various measurements to mitigate the effect of noise on the estimates. The synchronization module 344 may filter the estimates to provide timing and frequency offset updates to one or more components of the receiver 300.

The synchronization module 344 further generates the timing and frequency offset updates according to the predicted interference information 360 received from the interference module 304. For example, strong interference may degrade performance of the receiver 300 beyond duration of the interference due to effects on the filtering and averaging functions of the synchronization module 344. Accordingly, the synchronization module 344 is configured to adjust one or more functions of the synchronization module 344. The synchronization module 344 may suspend selected functions for at least the duration of the interference to prevent updates to other receiver components that would be affected by the interference.

For example, the synchronization module 344 may suspend measurement functions of the synchronization module 344 for at least the duration of the predicted interference, and discard or puncture any measurements taken during the interference. The synchronization module 344 may suspend filtering functions and discard any filtering results during the interference. The synchronization module 340 may also suspend generation of the timing and frequency offset updates during the interference. The synchronization module 344 resumes any suspended functions when the duration of the interference is complete. For example, the synchronization module 344 may suspend the selected functions for at least the duration of the interference, but in some implementations (e.g., in an OFDM receiver), may suspend the selected functions for a window that encompasses the duration (e.g., multiple OFDM symbols or subframes around the interference).

The channel estimation module 328 processes pilot signals using channel estimation filters (e.g., frequency-direction and time-direction filters) to generate the channel estimate. Interference may affect some of the corresponding pilot symbols. Accordingly, the channel estimation module 328 generates the channel estimate according to the predicted interference information 360 received from the interference module 304. For example, the channel estimation module 328 may suspend operation of channel estimation filters associated with the pilot symbols affected by the interference. In this manner, any effects of the corrupted pilot symbols are isolated from non-corrupted data/pilot regions of the channel estimate. For example, in a time-direction filter, the channel estimation module 328 may insert a filter edge at boundaries of the affected pilot symbols. Similarly, in a frequency-direction filter, the channel estimation module 328 may insert a filter edge at frequency boundaries of the affected pilot symbols. In other implementations, instead of inserting filter edges as described above, the channel estimation module 328 may generate the channel estimate using only pilot signals and channel estimates in the non-corrupted data/pilot regions. For example, the channel estimation module 328 may apply different weights to non-corrupted regions (e.g., a relatively high weight) and corrupted regions (e.g., a relatively low or zero weight).

The measurement module 348 measures various operation parameters of the receiver 300 and provides corresponding measurement information including, but not limited to, a signal quality of the signal received by the receiver 300, signal strength, reference signal received power (RSRP), reference signal received quality (RSRQ), receiver signal strength indicator (RSSI), channel state information measurements, channel quality index (CQI), a rank index (RI), a precoding matrix index (PMI), and/or feedback information related to, for example, providing feedback to a base station for link adaptation, beamforming, etc. The measurement module 348 provides the measurement information according to the predicted interference information 360 received from the interference module 304.

For example, for signal strength and quality measurements such as the RSSI, the RSRP, and/or the RSRQ, the measurement module 348 may suspend functions related to these measurements for at least the duration of the interference, suspend filtering functions related to these measurements, and/or discard any measurements taken during the interference. For channel state information measurements and feedback information provided by the measurement module 348 (e.g., the CQI, the RI, and/or the PMI), the measurement module 348 discards measurements taken during the interference.

Other receiver components, such as components related to data processing (e.g., the FFT module 324) may similarly adjust one or more functions in response to the interference information 360 received from the interference module 304. For example, data processing components of the receiver 300 may puncture data signals affected by the interference. Puncturing the data signals may include replacing corrupted data corresponding to the interference with another value, such as 0.

For example, when the duration of the interference is relatively short (e.g., only a portion of an OFDM symbol), the FFT module 324 may puncture time-domain samples affected by the interference at an input of the FFT module 324. When the interference is narrow-band, the FFT module 324 may puncture subcarriers affected by the interference at an output of the FFT module 324. The FFT module 324 may puncture only OFDM symbols affected by the interference to localize effects of the interference on subsequent processing. Similarly, in non-OFDM embodiments, the receiver 300 may puncture time-domain symbols affected by the interference from the whole received packet.

FIG. 4 shows an example interference module 400 that includes an alignment module 404 according to an embodiment of the present disclosure. In addition to (or instead of) the interference mitigation described in FIG. 3, the alignment module 404 may determine a timing of the predicted interference and align the interference to a selected portion of other signals being transmitted and/or received by the wireless communication device.

For example, the alignment module 404 communicates with transceivers 408-1, 408-2, . . . , and 408-*n*, referred to collectively as transceivers 408. The alignment module 404 may receive an indication that one of the transceivers 408 will be transmitting data that may cause predictable interference. For example, the transceiver 408-1 may need to transmit an ACK packet in response to receiving a data packet. The alignment module 404 may determine whether one or more of the other transceivers 408 is receiving (or transmitting) data that would be affected by the interference, and determine a desired timing of the predicted interference. The alignment module 404 provides alignment information corresponding to the desired timing of the predicted interference to the transceiver 408-1, which aligns transmission of the predicted interference (e.g., the ACK packet) according to the alignment information.

Figure 5:
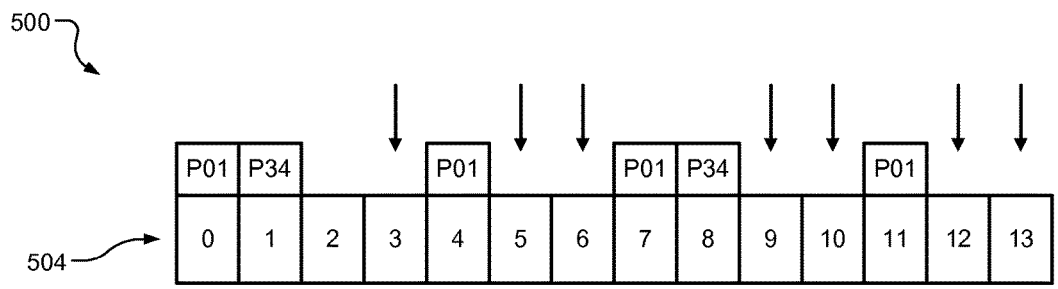
FIG. 5 illustrates example alignment of predicted interference with a subframe according to an embodiment of the present disclosure.

FIG. 5 illustrates an example alignment as described in FIG. 4. For example only, an LTE subframe 500 to be received by one of the transceivers 408 may include 14 OFDM symbols 504 (0-13). Some symbols (e.g., symbols 0, 1, 4, 7, 8, and 11, labeled P01 or P034) correspond to pilot reference symbols. For example, symbols 0, 1, and 2 may correspond to a control channel region of the subframe 500. The pilot reference symbols are used for channel estimation, demodulation, and other processing functions of the receiver. It is desirable to avoid corruption (e.g., as caused by predicted interference) of the pilot reference symbols and the control channel region to minimize the impact of the interference on receiver performance.

Accordingly, the alignment module 404 provides the alignment information to the transceiver 408-1 based on a desired timing of the predicted interference. For example, the alignment information may instruct the transceiver 408-1 to align transmission of the predicted interference with data portions (e.g., a downlink data portion including symbols 3, 5, 6, 9, 10, 12, and 13) of the subframe 500. In this manner, transmission of the predicted interference is aligned with selected portions (e.g., as indicated by the arrows in FIG. 5) of the subframe 500 to minimize the impact of the interference on receiver performance.

Figure 6:
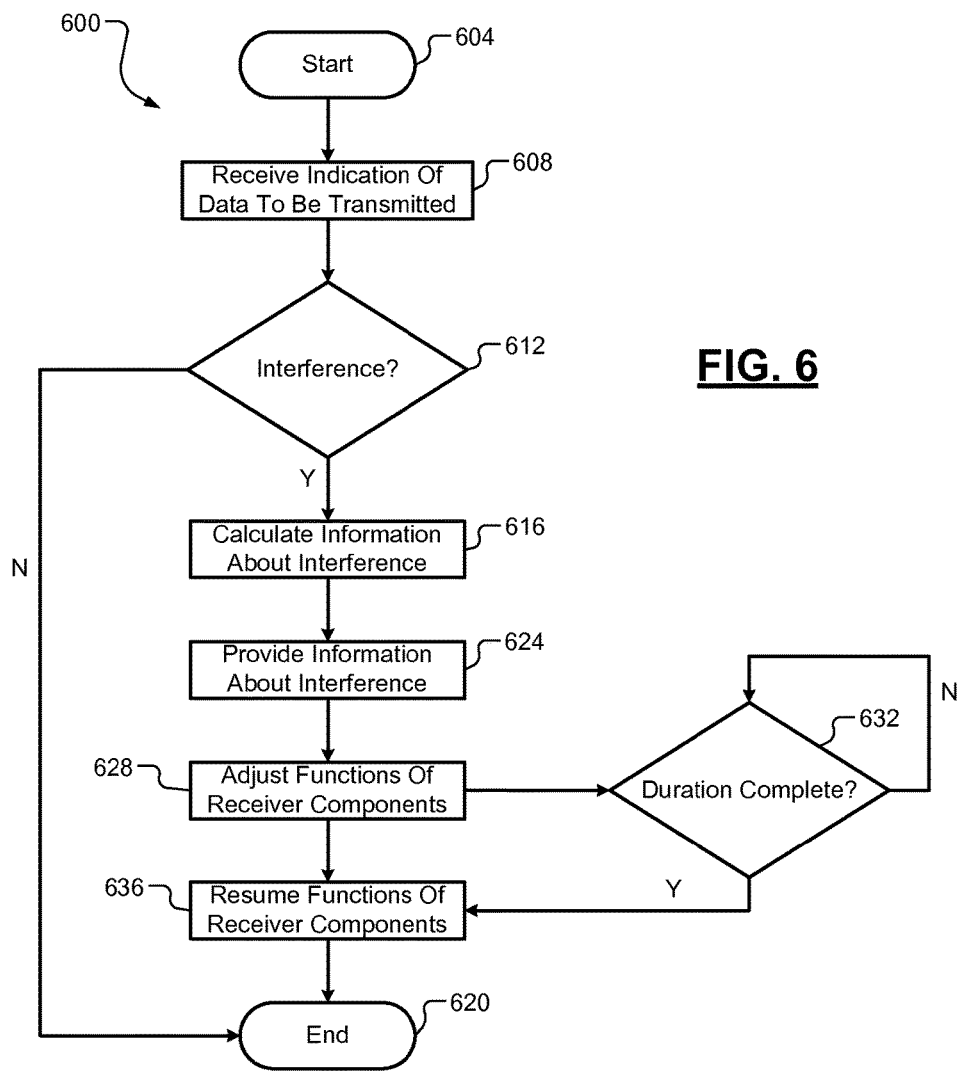
FIG. 6 is an example method for mitigating predicted interference according to an embodiment of the present disclosure.

FIG. 6 shows an example predicted interference mitigation method 600 that starts at 604. For example only, various portions of the method 600 may be executed by the interference module 304 and one or more components of the receiver 300. At 608, the method 600 receives an indication that data will be transmitted from a wireless communication device. For example, the interference module 304 may receive an indication from one of the transceivers 204 (e.g., the transceiver 204-1) intends to transmit data (e.g., an acknowledgement packet) from the wireless communication device.

At 612, the method 600 predicts whether the transmitted data will cause interference. If true, the method 600 continues to 616. If false, the method 600 ends at 620. At 616, the method 600 calculates information about the predicted interference. For example, the method 600 calculates, based on the received indication of the data to be transmitted, duration of the predicted interference. At 624, the method 600 provides the information about the predicted interference to one or more receiver components of the wireless communication device. For example, the information may include the duration of the interference. At 628, the method 600 adjusts (e.g., suspend) functions of the receiver components related to processing a received signal for at least the duration of the interference. For example, one or more of the receiver components may suspend the functions of the receiver related to processing the received signal in response to receiving the duration of the predicted interference.

At 632, the method 600 determines whether the duration is complete. For example, individual components of the receiver that have suspended functions related to processing the received signal determine whether the duration is complete. For example only, each of the components may include a timer that is set according to the duration. If true, the method 600 continues to 636. If false, the method 600 continues to 632. At 636, the method 600 resumes the suspended functions. The method 600 ends at 620.

Figure 7:
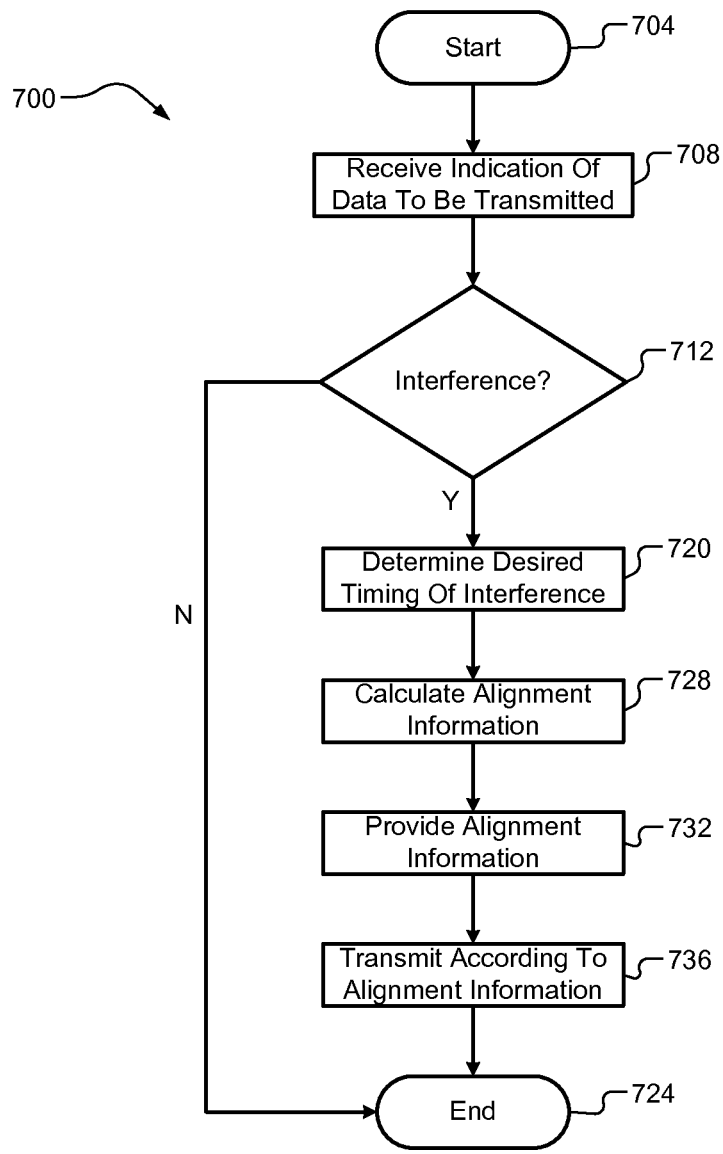
FIG. 7 is an example method for aligning interference according to an embodiment of the present disclosure.

FIG. 7 shows an example interference alignment method 700 that starts at 704. For example only, various portions of the method 600 may be executed by the interference module 400, the alignment module 404, and one or more components of the transceivers 408. At 708, the method 700 receives an indication that data will be transmitted from a wireless communication device. For example, the interference module 304 may receive an indication from one of the transceivers 408 (e.g., the transceiver 408-1) that the transceiver 408-1 intends to transmit data (e.g., an acknowledgement packet) from the wireless communication device. At 716, the method 700 predicts whether the transmitted data will cause interference. If true, the method 700 continues to 720. If false, the method 700 ends at 724.

At 720, the method 700 determines a desired timing of the interference according to other signals being received (or transmitted) by the wireless communication device. For example, the method 700 determines a desired timing of the interference based on data portions of an LTE subframe (i.e., to avoid interference during control channel regions/pilot reference signals of the LTE subframe). Accordingly, the desired timing corresponds to transmission periods to avoid and/or transmission periods to transmit the data. At 728, the method 700 calculates alignment information based on the desired timing. For example, the alignment information indicates the transmission periods to avoid and/or the transmission periods to transmit the data.

At 732, the method 700 provides the alignment information to the transceiver that will transmit the signal causing the predicted interference (e.g., the transceiver 408-1). At 736, the method 700 transmits, from the transceiver 408-1, the data/signal causing the predicted interference according to the alignment information. The method 700 ends at 724.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory (such as flash memory), volatile memory (such as static random access memory and dynamic random access memory), magnetic storage (such as magnetic tape or hard disk drive), and optical storage.

The apparatuses and methods described in this application may be partially or fully implemented by one or more computer programs executed by one or more processors. The computer programs include processor-executable instructions that are stored on at least one non-transitory, tangible computer-readable medium. The computer programs may also include and/or rely on stored data.

Various aspects of the system are described below. The system includes an interference module. The interference module is configured to determine, based on first data to be transmitted from a wireless communication device, information about interference predicted to be caused by the first data being transmitted, and provide, to a receiver of the wireless communication device, the information about the predicted interference. A component of the receiver of the wireless communication device is configured to receive, from the interference module, the information about the predicted interference, and adjust, for a duration of the predicted interference, a function performed by the component of the receiver. The function performed by the component of the receiver is related to processing a signal received by the receiver of the wireless communication device.

The information about the predicted interference includes the duration of the predicted interference. The first data corresponds to an acknowledgment packet to be transmitted by a wireless transceiver of the wireless communication device. The first data is to be transmitted by a first transceiver of the wireless communication device and the receiver corresponds to a second transceiver of the wireless communication device. The first transceiver corresponds to a WiFi transceiver and the second transceiver corresponds to a long-term evolution transceiver.

The component of the receiver corresponds to an automatic gain control module, a synchronization module, a channel estimation module, a measurement module, and/or a data processing component of the receiver. The function performed by the component of the receiver includes measuring components of the received signal, filtering the measured components, providing updates, channel estimation, and/or providing updates based on the measured components. The component of the receiver is configured to, to adjust the function performed by the component of the receiver, suspend the function for the duration of the predicted interference.

The system further comprises an alignment module configured to determine, based on the received signal, a desired transmission timing of the predicted interference and generate alignment information based on the desired transmission timing, wherein the alignment information corresponds to an arrangement of symbols in the received signal. The first data is transmitted from the wireless communication device in accordance with the alignment information A method includes determining, based on first data to be transmitted from a wireless communication device, information about interference predicted to be caused by the first data being transmitted, and providing, to a receiver of the wireless communication device, the information about the predicted interference. The method further includes, using a component of the receiver of the wireless communication device, receiving the information about the predicted interference, and adjusting, for a duration of the predicted interference, a function performed by the component of the receiver. The function performed by the component of the receiver is related to processing a signal received by the receiver of the wireless communication device.

Receiving the information about the predicted interference includes receiving the duration of the predicted interference. The first data corresponds to an acknowledgment packet to be transmitted by a wireless transceiver of the wireless communication device. The first data is to be transmitted by a first transceiver of the wireless communication device and (ii) the receiver corresponds to a second transceiver of the wireless communication device. The first transceiver corresponds to a WiFi transceiver and (ii) the second transceiver corresponds to a long-term evolution transceiver.

The component of the receiver corresponds to an automatic gain control module, a synchronization module, a channel estimation module, a measurement module, and/or a data processing component of the receiver. The function performed by the component of the receiver includes measuring components of the received signal, filtering the measured components, providing updates, channel estimation, and/or providing updates based on the measured components. Adjusting the function performed by the component of the receiver includes suspending the function for the duration of the predicted interference.

The method further includes determining, based on the received signal, a desired transmission timing of the predicted interference, and generating alignment information based on the desired transmission timing, wherein the alignment information corresponds to an arrangement of symbols in the received signal. The method further includes transmitting the first data from the wireless communication device in accordance with the alignment information.

What is claimed is:

1. A wireless communication device, comprising:
   an interference circuit (i) receiving an indication from a first transceiver of the wireless communication device that the first transceiver intends to at least one of transmit and receive a known first data packet, (ii) determining information about interference predicted to be caused by the known first data packet being transmitted or received, wherein the known first data packet and the corresponding predicted interference are non-periodic, and (iii) providing, to a receiver of the wireless communication device, the information about the predicted interference;
   an alignment circuit (i) determining, based on a signal received by the receiver, a desired transmission timing of the predicted interference and (ii) generating alignment information based on the desired transmission timing, wherein the alignment information corresponds to an arrangement of symbols in the received signal; and
   a component circuit of the receiver of the wireless communication device, the component circuit of the receiver (i) receiving, from the interference circuit, the information about the predicted interference and (ii) adjusting, for a duration of the predicted interference, a function performed by the component circuit of the receiver, wherein the function performed by the component circuit of the receiver is related to processing the received signal while the known first data packet is being transmitted or received such that the received signal includes the predicted interference caused by the known first data packet being transmitted or received,
   wherein, in adjusting the function performed by the component circuit of the receiver, the component circuit of the receiver suspends, for the duration of the predicted interference, at least one of
      automatic gain control functions that are used to adjust gain to compensate for the predicted interference, and
      signal measurement functions that are used to adjust calculation of signal characteristics to compensate for the predicted interference.

2. The wireless communication device of claim 1, wherein the information about the predicted interference includes the duration of the predicted interference.

3. The wireless communication device of claim 1, wherein the known first data packet corresponds to an acknowledgment packet to be transmitted by the first transceiver of the wireless communication device.

4. The wireless communication device of claim 1, wherein (i) the known first data packet is to be transmitted by the first transceiver of the wireless communication device and (ii) the receiver corresponds to a second transceiver of the wireless communication device.

5. The wireless communication device of claim 4, wherein (i) the first transceiver corresponds to a WiFi transceiver and (ii) the second transceiver corresponds to a long-term evolution transceiver.

6. The wireless communication device of claim 1, wherein the component circuit of the receiver corresponds to an automatic gain control circuit, a synchronization circuit, a channel estimation circuit, a measurement circuit, and/or a data processing circuit of the receiver.

7. The wireless communication device of claim 1, wherein the known first data packet is transmitted from the wireless communication device in accordance with the alignment information.

8. A method, comprising:
receive, at wireless communication device, an indication from a first transceiver of the wireless communication device that the first transceiver intends to at least one of transmit and receive a known first data packet;
determining information about interference predicted to be caused by the known first data packet being transmitted or received, wherein the known first data packet and the corresponding predicted interference are non-periodic;
providing, to a receiver of the wireless communication device, the information about the predicted interference; and
determining, based on a signal received by the receiver, a desired transmission timing of the predicted interference; and
generating alignment information based on the desired transmission timing, wherein the alignment information corresponds to an arrangement of symbols in the received signal; and
using a component circuit of the receiver of the wireless communication device
receiving the information about the predicted interference, and
adjusting, for a duration of the predicted interference, a function performed by the component circuit of the receiver, wherein the function performed by the component circuit of the receiver is related to processing the received signal, wherein the received signal includes the predicted interference caused by the known first data packet being transmitted or received,
wherein adjusting the function includes suspending, for the duration of the predicted interference, at least one of
automatic gain control functions that are used to adjust gain to compensate for the predicted interference, and
signal measurement functions that are used to adjust calculation of signal characteristics to compensate for the predicted interference.

9. The method of claim 8, wherein receiving the information about the predicted interference includes receiving the duration of the predicted interference.

10. The method of claim 8, wherein the known first data packet corresponds to an acknowledgment packet to be transmitted by the first transceiver of the wireless communication device.

11. The method of claim 8, wherein (i) the known first data packet is to be transmitted by the first transceiver of the wireless communication device and (ii) the receiver corresponds to a second transceiver of the wireless communication device.

12. The method of claim 11, wherein (i) the first transceiver corresponds to a WiFi transceiver and (ii) the second transceiver corresponds to a long-term evolution transceiver.

13. The method of claim 8, wherein the component circuit of the receiver corresponds to an automatic gain control circuit, a synchronization circuit, a channel estimation circuit, a measurement circuit, and/or a data processing circuit of the receiver.

14. The method of claim 8, further comprising transmitting the known first data packet from the wireless communication device in accordance with the alignment information.

* * * * *